March 22, 1966 R. E. HERSEY 3,242,263

SUPERVISORY TELEPHONE CIRCUIT

Filed Nov. 8, 1962 2 Sheets-Sheet 1

Inventor
Ralph E. HERSEY

Robert B. Harmon
ATTORNEY

March 22, 1966 R. E. HERSEY 3,242,263
SUPERVISORY TELEPHONE CIRCUIT
Filed Nov. 8, 1962 2 Sheets-Sheet 2

INVENTOR.
Ralph E. HERSEY
BY
Robert B. Harmon
ATTORNEY

1

3,242,263
SUPERVISORY TELEPHONE CIRCUIT
Ralph E. Hersey, 75 Cedar Lake E., Denville, N.J.
Filed Nov. 8, 1962, Ser. No. 236,363
7 Claims. (Cl. 179—9)

This invention relates to telephone systems and more particularly to supervisory circuits for such systems having automatic toll charging facilities.

In telephone systems employing toll charging facilities, it is the practice to provide a polarized relay in the originating office, the energization of which actuates the charging facilities. In these systems, the ringing current is applied at the terminating office, in the trunk extending to the called subscriber's station, by means of a ringing relay. When the called subscriber responds to the call, by lifting the switchhook, the release of the ringing relay, in association with a train of relays, causes the reversal of current toward the originating office as applied to the polarized relay so that it energizes to actuate the toll charging facilities and to allow the passage of speech current between the subscribers' stations. In order to establish this condition, it is necessary that the switchhook remain lifted so that a direct current path will exist through the called subscriber's line. The supervisory circuit includes means to supply energy and ringing current to the subscribers' stations and a differentiating circuit, including a talking charge relay, to characterize the call as being a free call or a charge call.

It has been found that an abnormal condition may be established at the terminating station which will permit subscribers to converse with each other without establishing the charging facilities as described above.

The principal object of this invention is to provide improved means to assure that charge conditons will be fully established in a telephone system having automatic toll charging facilities.

This and other objects of the invention are attained by providing a supervisory circuit in combination with a telephone system in which the switching connections are made, for instance, by a plurality of selecting switches, including a control circuit. Associated with the originating office is a call recording circuit which includes a polarized relay under the control of a current reversing relay at the terminating office. In my invention, a talking path between calling and called subscribers is complete during a toll call only if both the talking charge relay and the current reversing relay have operated, and incomplete if only the talking charge relay has operated. If the talking charge relay has not operated, indicating a free call, the talking path is complete. Return of ringing tone to the calling subscriber is not inhibited by the opening of the talking path.

Figure 1:
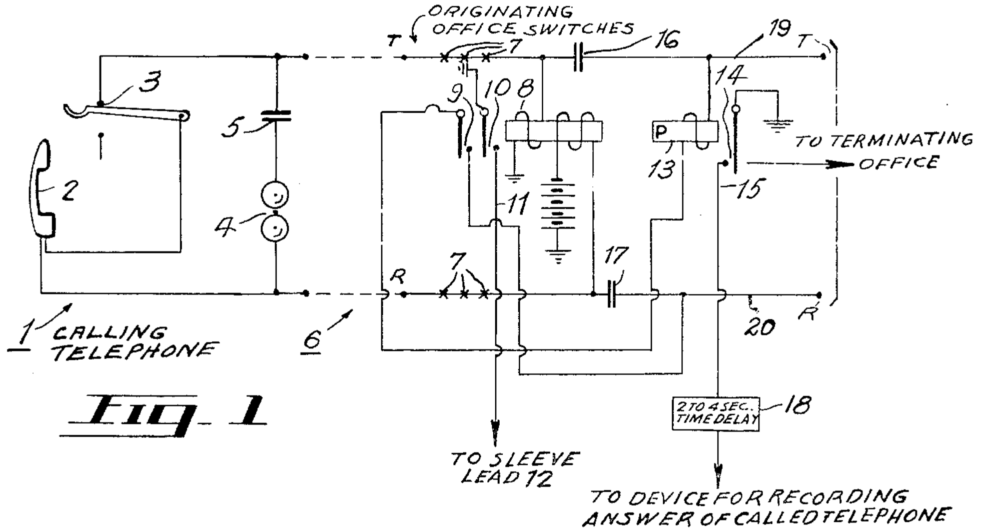
Figure 3:
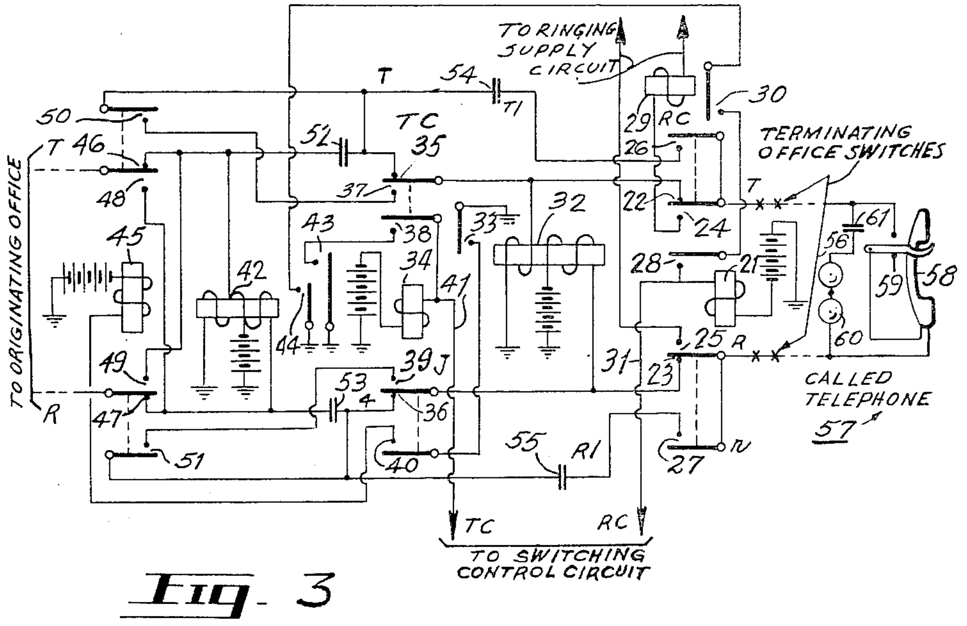
Figure 2:
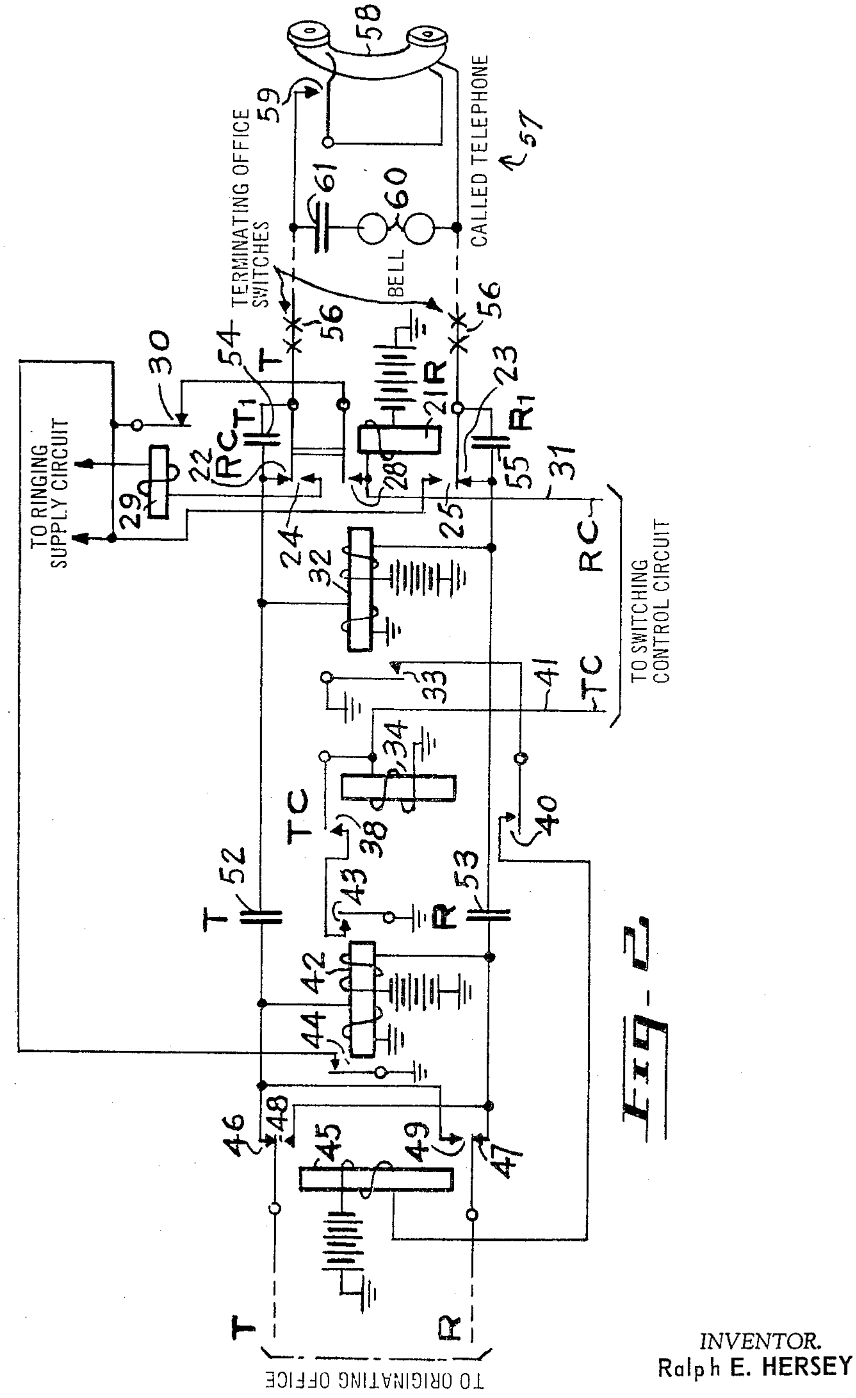

A better understanding of my invention may be had by referring to the following description, taken in conjunction with the drawings, in which:

FIGS. 1 and 2, when joined together, illustrate the schematic supervisory circuit of the talking path employed in a cross-bar switching type of telephone system; and FIG. 3 illustrates the schematic supervisory circuit of my invention, and may be joined to FIG. 1 in place of FIG. 2.

Considering FIG. 1, there is shown a calling subscriber's

2 station 1 having disposed therein a handset 2, switchhook 3, ringer 4 and capacitor 5.

The calling subscriber's station 1 is connected via a first transmission path to the originating telephone office 6 wherein there are shown automatic switches 7, calling bridge relay 8, provided with open contacts 9, 10. Contact 10 is connected through conductor 11 to the sleeve conductor 12 of the system so as to hold the switch train operated when the connection has been established, as is well known in the art.

Also shown in FIG. 1, is polarized circuit means, in this case being polarized relay 13 provided with open contact 14. Contact 14 is connected, through conductor 15 and time delay device 18, to a toll call registration means which may be a recording device (not shown). The time delay device 18 may consist of an arrangement of inductors and capacitors while the recording device may be any suitable device to register a toll call or to record the answer from a called subscriber. Further information for the apparatus may be had by referring to U.S. Patent 2,585,904 to A. J. Busch, February 19, 1952, line 69, column 147 to line 25, column 148. Calling bridge relay 8 is isolated from the polarized relay 13 by the capacitor 16, 17.

Considering FIG. 2, there is shown ringing control relay 21 having closed contacts 22, 23 and open contacts 24, 25, 28 and ringing supply relay 29 having closed contact 30. Ringing relay 21 is connected, through conductor 31, to the switching control circuit (not shown). By referring to U.S. Patent 2,585,904 to Busch, February 19, 1952, information with respect to the control unit may be obtained as follows: Lead RC is described with the sentence starting in column 177, line 33 and ends at line 69. The leads to the "ringing supply circuit" shown on applicant's FIG. 2 are referred to in different sections of the Busch U.S. patent, the most applicable being covered in column 179, lines 54 to 67. Lead TC is described in column 178 starting at line 1.

Also shown in FIG. 2 is the called bridging relay 32, connected across a pair of conductors of a third transmission path, having open contact 33, and talking charge relay 34 having open contacts 38, 40; the relay 34 being connected through conductor 41 to the switching control circuit. The switching control circuit may be the same as shown in FIG. 2 of U.S. Patent 2,595,904.

A source of current is connected through current supply relay 42, connected across the third transmission path which is provided with open contacts 43, 44. Current reversing relay 45, provided with closed contacts 46, 47 and open contacts 48, 49, is connected, through contact 40 of relay 34, to the contact 33 of called bridging relay 32. Capacitors 52, 53 are for isolating called bridging relay 32 from the current supply from relay 42. Ringing tone capacitors are shown as 54, 55, which are provided to return the ringing tone to the calling subscriber.

The originating telephone office 6 is connected to the terminating office over a pair of conductors 19 and 20. Automatic switches 56 at the terminating office, extend the connection via a second transmission path to the called subscriber's station 57 which is identical to the calling subscriber's station 1 having handset 58, switchhook 59, ringer 60 and capacitor 61.

FIG. 3 shows the same relays as FIG. 2. However, in my invention, ringing supply relay 21 operates two additional normally open contacts 26 and 27, current reversing relay 45 operates additional normally open contacts 50 and 51, and talking charge relay 34 operates two transfer contacts, one of which comprises make contact 37 and break contact 35, the other of which comprises make contact 39 and break contact 36.

Break contacts 35 and 36 of the transfer contacts serve to break the conductors of the third transmission path between calling and called subscribers when the talking charge relay is operated. The transfer springs are connected to the called subscriber, and thus may be seen to contact the make springs 37 and 39 when the talking charge relay has operated. The make springs are connected through make contacts 50 and 51 of current reversing relay 45 to the calling subscriber's ends of the pair of conductors broken by the break springs of said transfer contacts.

Also, ringing tone capacitors 54 and 55 are connected from the calling subscriber's ends of the pair of conductors broken by said transfer contacts to the transfer spring of the ringing supply relay 21, which leads to the called subscriber's line, instead of directly across contacts 22 and 23.

Using these additional contacts as described below, my invention ensures that the polarized relay 13 which operates the toll call registration means is operated only when a direct current path is complete to the called subscriber. In this way, it is not possible to obtain a talking path between calling and called subscribers using the method of cheating described below, and all completed talking paths on toll calls will result in charge conditions being established.

OPERATION

In the operation of the circuit of FIGS. 1 and 2, when the calling subscriber at station 1 lifts the handset 2, to close the contact of switchhook 3, the switches 7 at the originating office 6 are seized in the conventional manner which allows calling bridge relay 8 to operate. The operation of relay 8 permits current to be supplied to the subscriber's station 1. The energization of relay 8 also causes contacts 9, 10 of this relay 8 to close; contact 10 placing a ground potential on the sleeve lead of the system so as to hold the switches 7 in the seized position in a well known manner. The closing of contact 9 allows relay 42, FIG. 2, to energize through this contact, the coil of relay 13, and also contacts 46, 47 of relay 45 (FIG. 2) to the battery supply of relay 42.

When the calling subscriber dials the called number, if the call is a toll charge call, the digits dialled allows the switching control circuit to place a ground potential on the conductor 41 so that talking charge relay 34 is energized. Ringing relay 21 is also energized by a ground on conductor 31 and locks up through contacts 28, 30 and 44, relay 42 being energized as described heretofore. When the ringing relay 21 energizes, ringing current is transmitted to the called subscriber's station 57 through the closed contacts 24, 25. Ringing supply relay 29 does not energize at this time.

When the called subscriber at station 57 removes the handset 58 relay 29 energizes, breaking contact 30 and the locking circuit for ringing relay 21 which then releases to cut off the ringing current. When relay 21 releases, contacts 22 and 23 are closed so that the called bridging relay 32 energizes, thereby supplying energy to the called subscriber's station 57, and closes contact 33.

If the call is a free call, relay 34 is not operated and the talking path is over the circuit 58–59–22–52–46–19–16–7–3–2 and 58–56–23–53–47–20–17–7–2. If the call is a charge call, relay 34 is operated so that when the called subscriber lifts the handset 58, relay 32 operates and closes its contact 33. Relay 45 then operates through contacts 33, 40, reversing the current supplied to the polarized relay 13 (FIG. 1), allowing the call to be registered and/or recorded. The talking path is now over the circuit 58–56–22–52–49–20–17–7–2 and 58–56–23–53–48–19–16–7–3–2.

One method of cheating the polarized relay, and thus the toll call registration means consists in momentarily lifting the handset 58 on the switchhook 59, so as to operate the ringing trip relay 29 which in turn releases relay 21, and then to apply local isolated battery current to the handset 58 so that modulated transmission is generated and transmitted through a capacitor introduced across the switchhook contact 59, through the switches 56 and capacitors 52, 53 to the calling subscriber. Under this abnormal condition the talking path is still complete even though relays 32 and 45 are not operated and the charge condition is not established, since relay 13 is not operated.

The operation described above is for a well known supervisory and control circuit for a cross-bar type telephone system. The significance of the invention will now be disclosed by substituting FIG. 3 for FIG. 2.

It will be noted from the foregoing description that when the polarized relay 13 (FIG. 1) is operated, the called bridging relay 32 must be operated in order to operate the current reversing relay 45. Means have been provided whereby if the relays 32 and 45 have been prevented from operating, so as to prevent the operation of the polarized relay 13, and thus attempt to obtain a free call, no talking path will be closed. In my invention, the transmission path from one subscriber to the other is continuous through the break contact springs 35 and 36 of the transfer contacts of talking charge relay 34. Therefore, if the talking relay is not operated, corresponding to a charge-free call, the transmission path is unbroken. However, if a toll call is to be completed, the talking charge relay 34 is operated, and the break contacts open the transmission path, transferring the conductors leading to the called party to the make contact springs 37 and 39. It may be seen that the non-transfer springs lead to open contacts 50 and 51, which, when open, terminates the called party voice transmission path. Therefore, if the called party cheats as described above, no voice is transmitted to the calling party, no voice is transmitted from the calling to the called party.

However, if a direct current path is completed through the called subscriber's line, called bridging relay 32 operates, and since talking charge relay 34 has operated since we are considering a toll call, current reversing relay 45 is caused to operate through contacts 40 of relay 34 and contact 33 of relay 32. Thus current reversal is obtained on the trunk to the originating office, and polarized relay 13 operates, effecting a charge registration.

When current reversing relay 45 has operated, contacts 50 and 51 close. Therefore the voice transmission path is enabled, from the called subscriber's end of one of the conductors broken by the transfer contacts on relay 34, through, say, contact 37 on relay 34, contact 50 on relay 45, to the calling subscriber's end of that conductor; and also through contact 39 on relay 34 and contact 51 on relay 45 from the end of the other of said broken conductors. Thus it may be seen that voice transmission is enabled when both the talking charge relay 34 and the current reversing relay 45 have operated. It may also be seen that the invention described above is for a balanced line, and duplicates of all contacts have been provided for the two conductors. Therefore, for instance contacts 51, 36 and 39 may be deleted, and if so, the break in the conductor having its ends connected to contact 36 should not be present.

It is desirable to return a sample of ringing current to the calling subscriber, as ringing tone, so he may know that the called subscriber is being rung. Under the invention as described so far, since the transmission path is broken if the called is a toll and the called subscriber has not yet answered, no ringing tone would be transmitted back to the calling subscriber. Therefore, I have removed capacitors 54 and 55 from the circuit as shown in FIG. 2 and connected them from the calling subscriber's end of the said broken conductors through make contacts 26 and 27 of the ringing supply relay 21 to the conductors of the second transmission path leading to the called subscriber. Therefore, when ringing current is present on the called subscriber's line, and thus the second transmission path, some bypasses the transfer contacts 35, 37, and 36, 39 of relay 34 and is sent to the called subscriber.

To prevent the called subscriber from cheating as before by transmitting through capacitors 54 and 55, contacts 26 and 27 on relay 21 open when the called subscriber has at least momentarily lifted his handset, which cuts off the ringing supply relay 21 as described above.

Thus it may be seen that my invention has substantially eliminated the problem of cheating the polarized relay, and thus the toll call registration means, by applying a local battery through a capacitor to a handset, after causing the ringing supply relay to cut off, and reopening the subscriber's line. It has also substantially eliminated the possibility of voice transmission through the dial tone return capacitors after ringing has ceased.

What is claimed is:

1. In a telephone system comprising:

(a) a first transmission path leading to a calling subscriber's line;

(b) a second transmission path leading to a called subscriber's line;

(c) a third transmission path comprising a pair of conductors, connected between said first and second paths;

(d) polarized circuit means connected between said conductors at said first path, adapted, when current flows therethrough, to operate a toll call registration means;

(e) a source of current connected between said conductors;

(f) toll call indication means, operated when a call from the calling subscriber is a toll call;

(g) a called subscriber bridging relay connected across the third transmission path, operated when a direct current path exists through the called subscriber's line;

(h) current reversing relay adapted to reverse the polarity of the current from the source of current through said conductors to the polarized circuit means;

(i) the current reversing relay operating only when both the toll call indication means and the called subscriber's bridging relay means have operated;

(j) isolating means for isolating the called bridging relay and the conductors which may be between said relay and the called subscriber from the source of current;

a supervisory circuit in combination therewith comprising:

(k) means for open-circuiting the third transmission path if the toll call indication means has operated but the current reversing means has not operated, and (l) means for enabling the third transmission path if the toll call indication means has not operated, or both the toll call indication means and the current reversing means have operated.

2. A telephone system as defined in claim 1 comprising:

(a) a source of ringing current;

(b) a ringing supply relay adapted when operated to disconnect said second path from said third path and to connect said second path to the source of ringing current;

(c) means for applying a portion of the ringing current through said third path to said first path when the ringing supply relay has operated;

(d) the ringing current flowing to the calling subscriber's line continuing uninterrupted during the open-circuiting of said third path by said means therefor.

3. A telephone system as defined in claim 1 wherein (a) the polarized circuit means comprises a polarized relay, adapted to complete an energizing circuit for the call registration means when operated;

(b) the toll call indicating means comprises a talking charge relay having a first make contact;

(c) the called subscriber bridging relay means has a second make contact;

(d) said first and second contacts being connected in series in the energization path of the current reversing relay;

said supervisory circuit further comprising:

(e) a third make contact operated by the current reversing relay;

(f) a first transfer contact comprising a first break and fourth make contact, operated by the talking charge relay;

(g) a first conductor of said third path being continuous through said first break contact, with the common spring of the first transfer contact being connected to the end of the first conductor of said third path which is connected to said second path;

(h) the non-transfer make contact spring of the first transfer contact being connected through the third make contact on the current reversing relay to the end of the first conductor of said third path which is connected to said first path.

4. A telephone system as defined in claim 3 comprising:

(a) a source of ringing current;

(b) a ringing supply relay adapted when operated to disconnect said second path from said third path and to connect said second path to the source of ringing current;

(c) means for applying a portion of the ringing current through said third path to said first path when the ringing supply relay has operated;

(d) the ringing current flowing to the calling subscriber's line continuing uninterrupted during the open-circuiting of said third path by said means therefor, and wherein (e) the ringing supply relay has a fifth make contact; and (f) a first capacitor is connected in series with said fifth make contact between a conductor of the second transmission path and the broken end of the first conductor of the third transmission line which is connected to said first path.

5. A telephone system as defined in claim 4, comprising:

(a) a sixth make contact operating by the current reversing relay;

(b) a second transfer contact comprising a second break and a seventh make contact, operated by the talking charge relay;

(c) an eighth make contact operated by the ringing supply relay;

(d) a second capacitor;

(e) the other conductor of said third path being continuous through said second break contact, with the common spring of the second transfer contact being connected to the end of the other conductor of said third path which is connected to said second path;

(f) the second capacitor being connected in series with the eighth make contact between the other conductor of the second transmission path and the end of the other conductor of said third path which is connected to said first path;

(g) the non-transfer seventh make contact spring of the second transfer contact being connected through the sixth make contact on the current reversing relay to the end of the other conductor of said third path which is connected to said first path.

6. A telephone system as defined in claim 1, wherein the isolating means comprises a third and fourth capacitor, each connected in series with one conductor in said third path in such manner as to isolate the current which may be flowing from the source of current into said first path, from flowing through said third path into the called bridging relay and said second path.

7. A telephone system as defined in claim 5, wherein the isolating means comprises a third and fourth capacitor, each connected in series with one conductor in said third path in such manner as to isolate the current which may be flowing from the source of current into said first path, from flowing through said third path into the called bridging relay and said second path.

References Cited by the Examiner

UNITED STATES PATENTS

| | | | |
|---|---|---|---|
| 1,632,035 | 6/1927 | Morton | 179—9 |
| 2,096,436 | 10/1937 | Massonneau | 179—9 |
| 2,566,330 | 9/1951 | Horwitz | 179—9 |
| 2,619,545 | 11/1952 | Hersey | 179—7.1 |

ROBERT H. ROSE, *Primary Examiner.*

WALTER L. LYNDE, *Examiner.*

H. BOOHER, H. ZELLER, *Assistant Examiners.*